United States Patent [19]

Rogers

[11] Patent Number: 4,641,406

[45] Date of Patent: Feb. 10, 1987

[54] METHOD OF FORMING A RACK MEMBER

[75] Inventor: Peter R. Rogers, Chepstow, Wales

[73] Assignee: Cam Gears Limited, Hertfordshire, United Kingdom

[21] Appl. No.: 562,714

[22] Filed: Dec. 19, 1983

[30] Foreign Application Priority Data

Dec. 31, 1982 [GB] United Kingdom ................. 8237076

[51] Int. Cl.$^4$ .............................................. B21H 5/00
[52] U.S. Cl. ..................................... 29/159.2; 24/422
[58] Field of Search ................. 29/159.2, 412; 74/422, 74/498; 72/324, 341

[56] References Cited

U.S. PATENT DOCUMENTS 4,193,722  3/1980  Bishop ................................ 409/268

FOREIGN PATENT DOCUMENTS 73269    5/1982  Japan ...................................... 74/422
2026908  2/1980  United Kingdom .

Primary Examiner—Howard N. Goldberg
Assistant Examiner—P. W. Echols
Attorney, Agent, or Firm—Tarolli, Sundheim & Covell

[57] ABSTRACT

A variable ratio rack has a linear array of teeth. The teeth in the linear array are disposed at a plurality of final tooth angles. In order to form the rack, a linear array of teeth is cut in a workpiece. The teeth in the linear array of cut teeth have a tooth angle which is less than the largest tooth angle of the plurality of final tooth angles and greater than the smallest tooth angle of the plurality of final tooth angles. After the linear array of teeth has been cut in the workpiece, the cut teeth are deformed to have tooth angles corresponding to the final tooth angles.

8 Claims, 3 Drawing Figures

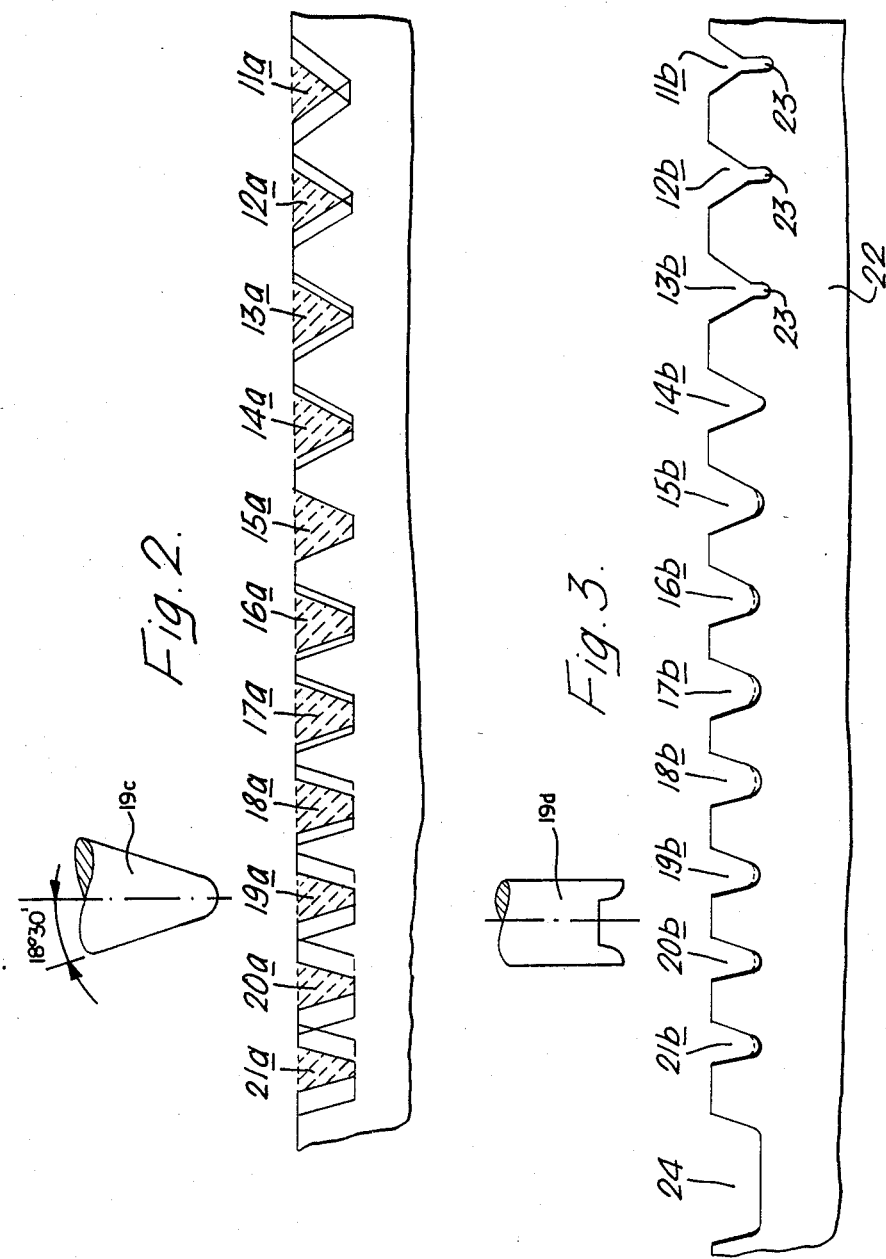

METHOD OF FORMING A RACK MEMBER

TECHNICAL FIELD AND BACKGROUND ART

This invention concerns a method of forming or manufacturing a rack which has a longitudinal array of rack teeth and which is intended for engagement with a helically toothed pinion so that rotation of the pinion will effect in displacement of the rack member. These latter combinations are commonly known as rack and pinion gears and are well known in the art of vehicle steering systems.

The present invention is more particularly concerned with the formation or manufacture of a rack member of the type (hereinafter referred to as "of the type specified") having a longitudinal array of rack teeth which are intended for engagement with a helically toothed pinion having constant pitch helical teeth whereby rotation of the pinion will effect in displacement of the rack member along a longitudinal axis of that member, and in which at least some of the rack teeth are variable ratio teeth formed with varying pitch, with shapes that vary over the widthwise extent of the rack, and with tooth angles in the plane of the rack which are directed widthwise of said teeth and are inclined relative to the longitudinal axis and wherein said shapes and tooth angles vary between adjacent teeth so that when the variable ratio teeth are engaged by the pinion during displacement of the rack member they provide a relatively smooth variation in drive ratio between the pinion and rack member. A rack member of the type specified in combination with a conventional helical pinion is commonly known as a variable ratio rack and pinion gear and an example is to be found in U.K. Patent No. 1,356,172 which is primarily intended for vehicle steering.

In a conventional rack and pinion gear providing a constant ratio the rack teeth are of constant pitch, are of the same and constant shape over their widthwise extent and are parallel in their widthwise extent so that all of the teeth have the same tooth angle. Such a constant ratio rack member is conventionally formed by a simple broaching technique whereby a gang of cutters, which are identically shaped to each other and to correspond with the profile of the trough which is to be formed between each pair of adjacent teeth in the array, are displaced in parallel and along the tooth angle relative to a workpiece from which the rack member is to be formed to simultaneously cut the constant ratio rack teeth at the required pitch. However, with a variable ratio rack member of the type specified, both the tooth angle and the shape of the teeth will vary between two or more adjacent (variable ratio) teeth in the array. This variation may be for a part length only of the array of rack teeth so that teeth in one or more part lengths of the array may be intended to provide constant ratio when engaged by the pinion while teeth (variable ratio teeth) in one or more other parts of the array are intended to provide the variable ratio characteristic where the effective pitch changes as the pinion moves over the teeth in that part. Alternatively the teeth on the rack member may provide a constantly varying ratio whereby there is a slight ratio change during displacement of the pinion from any one tooth to another in the array on the rack member. Because of the change in the tooth angles, in the effective pitch and in the shapes (particularly as regards the variation in the profiles and the flank angles of the tooth flank surfaces) of the variable ratio teeth there is a problem in accurately forming or manufacturing these teeth (and thereby the array of rack teeth generally) in a manner which is economically and commercially viable and to the required accuracy for use, particularly in vehicle steering gears. The simple broaching technique with a gang of cutters as previously discussed is inappropriate, primarily because of the aforementioned changes in the tooth angles and in the profiles of the variable ratio teeth over their widthwise extent. However, prior proposals for forming the teeth include electro machining which is believed to be too expensive and too slow; coin pressing which requires considerable capital expense and is believed to be unacceptable for the reason that too much metal has to be displaced in the basic workpiece during the formation of the teeth, and a broaching/coining technique whereby an array of upstanding projections are rough formed on a workpiece by broaching followed by coining said projections to reduce their height and to shape them into rack teeth with the required characteristics, again with this general proposal it is believed that too much metal has to be displaced during the coining operation for the technique to be commercially acceptable. Discussions of the aforegoing proposals are to be found in the aforementioned U.K. Patent No. 1,356,172 and in U.K. Patent Specification No. 2,026,908. It is therefore an object of the present invention to provide a method of forming or manufacturing a rack member of the type specified which alleviates the disadvantages of the prior proposals.

STATEMENT OF INVENTION AND ADVANTAGES

According to the present invention there is provided a method of forming a rack member of the type specified which comprises:

(a) determining the apparent notional or theoretical profiles and disposition which would be presented by the respective array of spaces between the rack teeth in the array on the member which is to be formed and which apparent notional profiles and disposition correspond to a notional or theoretical view of the rack teeth along a predetermined constant tooth angle which is disposed between the maximum and minimum tooth angles of the rack teeth in the array;

(b) providing an array of cutters respectively corresponding, substantially, in profile and disposition to the said apparent notional profiles and disposition presented by the array of tooth spaces;

(c) displacing the array of cutters to cut, in a metal workpiece from which the rack member is to be formed, a primary array of rack teeth, said cutters being displaced in parallel along cutting axes each of which corresponds to said constant tooth angle to form the primary rack teeth with the predetermined constant tooth angle and so that the section of each primary tooth in a plane which extends perpendicularly to the tooth angle is substantially constant over the widthwise extent of that tooth and the profiles and disposition of the spaces between the primary teeth substantially correspond to said apparent notional profiles and disposition, and (d) subjecting the primary rack teeth to a press operation whereby the metal of the workpiece is displaced to a condition corresponding to the shapes, disposition and tooth angles required of the rack teeth in the rack member.

In the aforegoing statement it is mentioned that the array of cutters correspond "substantially" in profile with the notional profiles presented by the tooth spaces as viewed along the predetermined constant tooth angle. By this it is intended that the cutters should correspond to said notional profiles to an extent which, in practice, will facilitate both the machine cutting and subsequent pressing of the workpiece, particularly in the root region of the primary rack teeth. For example, the spaces cut between the primary rack teeth may have their roots rounded-off slightly above where the roots are to be located for the corresponding teeth in the rack member as finally pressed and/or provided with narrow channels which extend the effective depth of the primary teeth to that required of the finished teeth.

The present invention envisages forming the rack member of the type specified by what is basically a two stage process, firstly accurately cutting primary teeth in a workpiece with all of the teeth disposed at the same tooth angle and each tooth being of constant sectional shape over its widthwise extent (but with the said shape and spacing of the primary teeth varying as required along the array) and secondly subjecting the primary teeth to a press operation such as coining whereby the metal of the workpiece is displaced to re-shape and position the primary teeth as necessary into the form required for the variable ratio rack member. To alleviate unnecessary stress in the metal during the pressing operation it is most desirable that the primary teeth are machined on the workpiece with shapes and at such a tooth angle and disposition that the minimum of displacement of metal is required during the subsequent pressing of the array of teeth on the rack member. This desirable characteristic may be achieved by appropriate selection of the constant tooth angle which is utilised for determining the profile and disposition of the cutters and also the cutting angle during the formation of the primary teeth. Bearing in mind that the aforementioned predetermined constant angle is disposed between the maximum and minimum tooth angles of the rack teeth in the array which are to be provided on the rack member, it will be apparent that during the pressing operation metal from some of the primary teeth will be displaced axially of the workpiece in one sense of direction while metal in other primary teeth will be displaced in the opposite sense of axial direction and ideally the displacement of metal in the opposite senses should be substantially balanced so that the amount of metal displacement is maintained at a minimum. Preferably therefore the predetermined constant tooth angle as aforementioned will be substantially the mean or average tooth angle between the maximum and minimum tooth angles of the rack teeth in the array on the rack member; this mean or average tooth angle is particularly advantageous where the rack teeth provide a variation in ratio over all of the teeth in the array between maximum and minimum tooth angles.

Preferably the array of cutters are displaced simultaneously along their respective and parallel cutting axes simultaneously to cut the primary array of rack teeth. Each cutter of the array may be in the form of an endless band and the primary teeth may thereby be formed in a similar manner to a conventional broaching technique. This latter technique followed by the relatively simple coin pressing operation lends itself to commercially viable and economic manufacture of a variable ratio rack member of the type specified.

Still further there is provided a rack member of the type specified when formed by the method stated as being in accordance with the present invention.

DRAWINGS

One embodiment of the present invention will now be described, by way of example only, with reference to the accompanying illustrative drawings in which:

FIG. 1 is a view in the plane of the rack of a rack member of the type specified and which is to be formed by the method of the present invention;

FIG. 2 illustrates the profile and disposition presented by the rack teeth and the respective spaces between those teeth in the left hand half of the array on the member shown in FIG. 1, said profile and disposition corresponding to a view of each of the rack teeth along a predetermined constant tooth angle indicated by the arrow X in FIG. 1, and FIG. 3 illustrates the profile and disposition of the primary teeth cut in the workpiece by an array of cutters the characteristics of which are determined from the profile presented in FIG. 2.

DETAILED DESCRIPTION OF DRAWINGS

Figure 1:
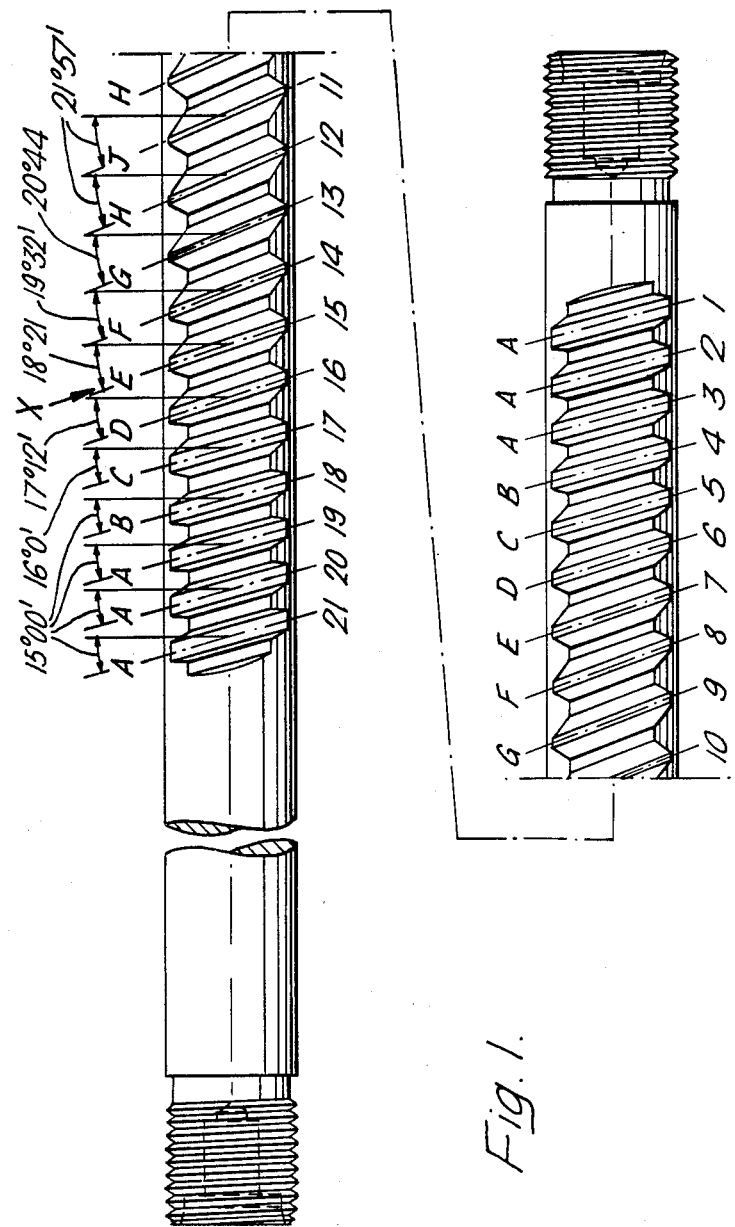

The rack member which is to be formed and as shown in FIG. 1 has a general structure which may be regarded as conventional for use in a vehicle steering system. It comprises a steel bar the ends of which are appropriately machined for coupling with the steering linkage and which bar has formed in its surface a longitudinal array of twenty rack teeth with tooth spacings indicated at 1 to 21. The rack teeth are intended for engagement with a helically toothed rotatable pinion (not shown) in the steering gear, the teeth of the pinion being at constant pitch and being arranged so that upon rotation of the pinion the rack member is displaced along its longitudinal axis. More particularly, the rack member when engaging with the pinion provides what is commonly known as a variable ratio rack and pinion gear where at least some of the rack teeth are variable ratio teeth formed with shapes that vary over the widthwise extent of the rack and tooth angles in the plane of the rack which are directed widthwise of the teeth and vary between adjacent rack teeth so that during displacement of the rack member by the pinion, the variable ratio teeth provide a change in pitch and thereby a variation in drive ratio between the pinion and rack member.

In the present embodiment the variation in ratio is intended to be symmetrical about the mid-length position of the rack; this position is disposed centrally (both in the longitudinal and widthwise senses) of the tooth space 11. Furthermore, the rack teeth are arranged so that those in the central region of the rack provide a constant low mechanical advantage when driven by the pinion (and thus have a large effective pitch) while the teeth towards each end of the rack are intended to provide a constant high mechanical advantage when driven by the pinion (and thus have a relatively smaller effective pitch). To provide a smooth transition in drive from the pinion between the large and small pitch regions, there are provided arrays of variable ratio teeth.

Since the ratio characteristics for the rack and pinion gear are symmetrical about the tooth spacing 11 and thereby the shapes of the teeth over their widthwise extent, the tooth angles (indicated by the lines A to J) and the respective spacings between adjacent teeth may be regarded as simalar on both sides of the aforementioned spacing 11 we can, conveniently, consider the formation of an end half of the rack (say that end formed with the tooth spacings 11 to 21) it being realised that the other end half will be similarly formed. With this in mind the teeth formed between the respective spacings 11 to 18 are variable ratio teeth, and as can be seen from FIG. 1, with the effective pitch between those teeth progressively reducing towards the ends of the rack, the tooth angles changing as indicated by the lines B to J and the profile or shape of each of the variable ratio teeth differing from that of respective teeth to which it is adjacent in the manner discussed in U.K. Patent Specification No. 1,356,172 . In contrast the teeth formed between the respective tooth spacings 18 to 21 are constant ratio teeth so that they are substantially identical to each other with a constant pitch between them and with their respective tooth angles being the same (as indicated by the lines A).

In the present example the tooth angles A to J (which are taken in the plane of the rack and with respect to a plane which extends perpendicularly from the longitudinal axis of the rack member) reduce from the midlength position of the rack towards the ends of the rack and, as indicated on FIG. 1, from 21°57′ to 15°00′ (with the three teeth at each respective end of the rack having the same tooth angle of 15°). As previously discussed the variation in the tooth angle and in the shape of the variable ratio teeth over their widthwise extent renders the rack member extremely difficult to produce practically and in a manner which is commercially viable and it is believed that this difficulty will be alleviated by the method of manufacture hereinafter described.

The conventional, and what is usually regarded as the most economical, method of forming constant ratio rack teeth is by broaching where a gang of cutters move in parallel through the workpiece at a predetermined angle to the longitudinal axis of the workpiece to progressively cut each tooth simultaneously to the same tooth angle and to the required profile. In the present embodiment this simple broaching technique is employed to an extent permitted by the characteristics of the variable ratio teeth which are required on the finished work and preferably so that during broaching the maximum amount of material is removed from the workpiece to form an array of primary teeth and respective tooth spaces from which the material can readily be coined into the final shapes and tooth angles required of the rack teeth. Having this in mind it is necessary, prior to broaching, to determine the apparent notional profiles and dispositions which would be presented by the respective spaces 1 to 21 between the rack teeth that are intended to be formed on the rack member shown in FIG. 1. It will be realised however that these notional profiles will vary depending upon the angle at which the rack member is viewed notionally or theoretically in the plane of the rack teeth and along a predetermined tooth angle. By notionally viewing the rack teeth in FIG. 1 along a predetermined tooth angle which is disposed between the maximum and minimum tooth angles of the rack teeth in the array, it is possible to derive an optimum angle which, if applied to the cutters during the aforementioned broaching, would result in the maximum quantity of material being cut away in conventional manner to form an array of primary teeth within which exist the form of the rack teeth and which can subsequently be displaced in a press operation into the final tooth form in an efficient and economical manner.

Preferably the notional profile of the rack teeth which is used to determine the characteristics for broaching the primary teeth in a workpiece from which the rack member is to be formed is that which results from a notional view of the rack teeth in a direction which approximates to the mean or average tooth angle between the maximum and minimum tooth angles of the rack teeth in the array on the rack member. In FIG. 1 the maximum and minimum tooth angles are shown as 21°57′ and 15°00′ respectively so that the mean or average tooth angle is approximately 18°30′. If each of the rack teeth in FIG. 1 is now viewed notionally in the direction of arrow X in the plane of the rack and said direction is at the aforementioned predetermined mean or average tooth angle of approximately 18°30′, the tooth profile which results from the notionally visible spacings between the rack teeth is as shown in FIG. 2. For convenience, only the lefthand half of the rack has been illustrated in FIG. 2 in which the shaded regions 11a to 21a indicate the notional profile presented by the spacings 11 to 21 when viewed along arrow X.

Having determined the notional profile for the spacings 11a to 21a, it must follow that if the workpiece is machined by cutters to remove material in accordance with the respective profiles and disposition of the shaded regions 11a to 21a and so that the respective profiles remain constant over the widthwise extent of the workpiece and at the predetermined constant tooth angle of 18°30′, there will result on the workpiece an array of primary teeth within which exist the final form of rack teeth intended for the rack member. Accordingly, a gang of broaching cutters is provided of which only one cutter 19c is shown in FIG. 2. The cutters correspond, substantially, in profile and disposition to the respective profiles and disposition presented by the notional tooth spaces 11a to 21a (and also of course to the notional tooth spaces which correspond to the tooth spaces 1 to 10). This gang of broaching cutters is then used to cut, in a bar 22 from which the rack member is to be formed (see FIG. 3), a primary array of rack teeth with tooth spaces 11b to 21b respectively. In forming the primary array of rack teeth the cutters are displaced in parallel along cutting axes each of which corresponds to the aforementioned constant tooth angle of 18°30′ with respect to a radial plane from the longitudinal axis of the bar 22. Accordingly the section of each primary tooth in a plane perpendicular to the said constant tooth angle is substantially constant over the widthwise extent of that tooth and the profiles and disposition of the spaces between the primary teeth substantially correspond to the apparent notional profiles and disposition of the notional tooth spaces 11a to 21a as shown in FIG. 2.

It will be noted by comparing the tooth spaces in FIG. 3 with the notional tooth spaces in FIG. 2 that slight deviations are permissible in the profiles to facilitate the broaching operation and/or the press operation to which the workpiece 22 is subsequently subjected. For example, it is recognised that broaching to a point or apex is inefficient as giving an uneconomically short tool life; consequently the notional apices presented by roots of the notional tooth spaces 11a to 13a have been developed into channels 23 at the roots of the corresponding tooth spaces 11b to 13b in the primary teeth. Also the roots of the notional tooth spaces 14a to 21a have been rounded off in broaching the spaces 14b to 21b to extend the cutter life in machining those spaces on the workpiece 22.

The final forming of the rack teeth shown in FIG. 1 is achieved by subjecting the primary teeth on the workpiece 22 to a press operation during which the material of the workpiece is displaced and the primary teeth are deformed as necessary into a condition corresponding to the shapes, disposition and tooth angles of the rack teeth of FIG. 1. Coin pressing is a well known and extremely accurate technique of metal shaping and as such need not be described in detail herein. Suffice it to say that the coining dies of which one die 19d is fragmentally shown in FIG. 3 will have an accurate internal profile which is complementary to the rack teeth in FIG. 1 and which, upon being closed over the workpiece 22 will displace the material of the primary teeth into the required tooth form for the rack member. Because the primary teeth on the workpiece 22 have been machined with a constant tooth angle of 18°30' (which approximates to the average tooth angle for the rack member), material from some of the primary teeth will be displaced axially of the workpiece in one sense of direction while material in other primary teeth will be displaced in the opposite sense of axial direction. This usefully serves to provide a pressure balancing effect within the die and also minimizes the extent to which each of the primary teeth should have to be displaced axially and to be re-shaped during the press operation to form the final tooth shape to which that primary tooth corresponds on the rack member. In this latter re-shaping of the primary teeth, the channels 23 which are formed during broaching to extend the height of the primary teeth (preferably to the height required of the finished rack teeth) may serve to facilitate the flow of metal during coining; this is also true of the "rounding-off" provided for the roots in the spaces 14b to 21b. If necessary this latter rounding-off may be effected in the primary teeth at positions which are slightly higher (as indicated by the broken lines in the roots of tooth spaces 15b to 21b and say in the order of six thousandths of an inch) than the positions corresponding to the roots which are to be formed in the rack teeth which correspond to the aforementioned primary teeth—this it is believed will facilitate the displacement of the material during coining and alleviate undesirable strain in the finally formed teeth (for example, by enabling a higher load to be applied at the ends of the coining die during the coining operation to equalise the load required from the centre of the rack to both of its ends).

The internal forces to which the dies are subjected in metal coining are considerable, particularly for a bulky workpiece such as the rack member. To accommodate these forces the walls of the die are likely to be of considerable thickness. With this in mind the ends of the rack shown in FIG. 1 are preferably provided with recesses 24 (see FIG. 3). The axial extent of each recess 24 is much greater than a tooth space and a die wall of considerable thickness can be received within the recess 24 to withstand the die pressures and support the end rack tooth adjacent to the die wall against possible fracture or malformation. The recesses 24 are conveniently cut simultaneously with the broaching of the primary teeth.

I claim:

1. A method of forming a workpiece into a rack having a linear array of teeth located between opposite ends of the rack, the teeth in the linear array being disposed at a plurality of final tooth angles, said method comprising the steps of:

cutting a linear array of teeth in a workpiece, at least certain of the teeth in the linear array of cut teeth having a tooth angle which is both less than the largest tooth angle of the plurality of final tooth angles and greater than the smallest tooth angle of the plurality of final tooth angles, and thereafter, deforming at least said certain teeth to have tooth angles corresponding to said final tooth angles.

2. A method as set forth in claim 1 wherein the length of the linear array of cut teeth corresponds to the length of the linear array of teeth on the rack.

3. A method as set forth in claim 2 wherein each tooth in the linear array of cut teeth has the same cross sectional configuration throughout the length of the tooth.

4. A method as set forth in claim 3 wherein one of the cut teeth in the linear array of cut teeth has a first cross sectional configuration and another of the cut teeth in the linear array of cut teeth has a second cross sectional configuration which is different than the first cross sectional configuration.

5. A method as set forth in claim 1 wherein said step of cutting a linear array of teeth in the workpiece includes effecting relative movement between a plurality of cutters and the workpiece to simultaneously cut each of the teeth in the array of cut teeth.

6. A method as set forth in claim 5 wherein said step of cutting a linear array of teeth in the workpiece includes cutting at least a first one of the cut teeth to have a first cross sectional configuration in a plane extending perpendicular to the cutting angle and cutting at least a second one of the cut teeth to have a second cross sectional configuration in a plane extending perpendicular to the cutting angle, said first cross sectional configuration being different than said second cross sectional configuration.

7. A method as set forth in claim 5 wherein said step of cutting a linear array of teeth in the workpiece includes the step of simultaneously cutting each of the teeth in the linear array of teeth with the plurality of cutters.

8. A method of forming a workpiece into a rack having a linear array of teeth located between opposite ends of the rack, the teeth in the linear array being disposed at plurality of tooth angles, said method comprising the step of:

providing at elongated workpiece, providing a plurality of cutters, effecting relative movement between the cutters and workpiece along a path which extends at a predetermined cutting angle relative to a plane perpendicular to the central axis of the workpiece, the cutting angle being less than the largest tooth angle of the plurality of tooth angles and greater than the smallest tooth angle of the plurality of tooth angles, cutting a linear array of teeth in the workpiece with the length of the linear array of cut teeth corresponding to the length of the linear array of rack teeth, each of the teeth in the linear array of cut teeth having a tooth angle corresponding to the predetermined cutting angle, each tooth in the linear array of cut teeth having the same cross sectional configuration throughout the length of the tooth in a plane extending perpendicular to the path of movement between the cutters and workpiece, and thereafter, deforming at least some of the cut teeth to have tooth angles other than the cutting angle.

* * * * *